United States Patent
Weber, Jr.

(10) Patent No.: US 9,402,384 B2
(45) Date of Patent: *Aug. 2, 2016

(54) SPORT SEATING SYSTEM AND METHOD

(71) Applicant: George L. Weber, Jr., Great Bend, KS (US)

(72) Inventor: George L. Weber, Jr., Great Bend, KS (US)

(*) Notice: Subject to any disclaimer, the term of this patent is extended or adjusted under 35 U.S.C. 154(b) by 52 days.

This patent is subject to a terminal disclaimer.

(21) Appl. No.: 14/456,793

(22) Filed: Aug. 11, 2014

(65) Prior Publication Data

US 2015/0042132 A1 Feb. 12, 2015

Related U.S. Application Data

(60) Provisional application No. 61/864,254, filed on Aug. 9, 2013.

(51) Int. Cl.
| | | |
|---|---|---|
| *A47C 3/34* | (2006.01) | |
| *A47C 4/02* | (2006.01) | |
| *A47C 5/04* | (2006.01) | |
| *A47C 9/10* | (2006.01) | |
| *A01M 31/02* | (2006.01) | |

(52) U.S. Cl.
CPC .............. *A01M 31/02* (2013.01); *A47C 3/34* (2013.01); *A47C 4/028* (2013.01); *A47C 5/043* (2013.01); *A47C 9/10* (2013.01)

(58) Field of Classification Search
CPC ......... A01M 31/02; A47C 3/34; A47C 4/028; A47C 5/043; A47C 9/10
USPC ............... 297/440.1, 440.16, 440.24, 188.2, 297/188.12, 188.08
See application file for complete search history.

(56) References Cited

U.S. PATENT DOCUMENTS

| | | | | | |
|---|---|---|---|---|---|
| 3,266,843 | A | * | 8/1966 | Feder | A47C 4/02 297/411.28 |
| 4,119,044 | A | * | 10/1978 | Hines | B25H 1/16 108/146 |
| 4,302,048 | A | * | 11/1981 | Yount | A47C 4/028 297/440.1 |
| 4,428,617 | A | * | 1/1984 | Lawson | A01K 97/06 114/363 |
| 4,579,198 | A | * | 4/1986 | Lee | E04H 15/001 108/135 |
| 4,582,165 | A | * | 4/1986 | Latini | A01M 31/02 108/152 |
| 4,588,227 | A | * | 5/1986 | Austin | A47C 4/022 297/440.11 |
| 4,784,436 | A | * | 11/1988 | Sutherland | A47C 4/02 297/440.11 |
| 4,893,958 | A | * | 1/1990 | Wieland | A47C 4/02 403/297 |
| 5,058,949 | A | * | 10/1991 | Von Hoffman | A47C 4/286 297/378.12 |
| 5,536,063 | A | * | 7/1996 | Cable | A47C 4/03 297/16.2 |
| 5,921,629 | A | * | 7/1999 | Koch | B64D 11/06 244/118.6 |

(Continued)

*Primary Examiner* — Timothy J Brindley
(74) *Attorney, Agent, or Firm* — Law Office of Mark Brown, LLC; Mark E. Brown; Christopher M. DeBacker

(57) ABSTRACT

A transformable sporting chair system which can be transformed from a working seat for use in the outdoors, to a transportable configuration for carrying the chair to or from an outdoor location. The chair features a frame which can be nearly entirely disassembled and reassembled into the working or transport configuration. The chair includes a holding element for holding tools or equipment, such as a hunting bow. The chair may also be strapped to a tree using ratchet straps.

15 Claims, 12 Drawing Sheets

(56) References Cited

U.S. PATENT DOCUMENTS

| | | | | |
|---|---|---|---|---|
| 5,927,437 A * | 7/1999 | Fast | A01M 31/02 | 182/187 |
| 6,039,403 A * | 3/2000 | Hargroder | A47K 3/122 | 297/440.16 |
| 6,045,179 A * | 4/2000 | Harrison | A47C 7/70 | 248/447.1 |
| 6,935,683 B1 * | 8/2005 | Brown | A47C 7/70 | 297/153 |
| 7,226,126 B1 * | 6/2007 | Spanovich | A47C 4/286 | 135/96 |
| 9,010,853 B2 * | 4/2015 | Motta | A47C 7/70 | 297/170 |
| 2004/0074697 A1 * | 4/2004 | Berzowski | A01M 31/02 | 182/127 |
| 2005/0179304 A1 * | 8/2005 | Serhan | A47K 3/282 | 297/440.24 |
| 2012/0119044 A1 * | 5/2012 | Wilson | A01M 31/02 | 248/219.4 |
| 2012/0211306 A1 * | 8/2012 | Benefield | E06C 7/16 | 182/115 |
| 2013/0328374 A1 * | 12/2013 | Priest | A47C 5/043 | 297/411.2 |
| 2014/0008149 A1 * | 1/2014 | Fogel | A01M 31/02 | 182/129 |
| 2014/0138185 A1 * | 5/2014 | Samona | A01M 31/02 | 182/187 |
| 2014/0332315 A1 * | 11/2014 | Moore | A01M 31/02 | 182/129 |
| 2015/0042132 A1 * | 2/2015 | Weber, Jr. | A47C 4/028 | 297/188.2 |
| 2015/0053503 A1 * | 2/2015 | Richey | A01M 31/02 | 182/187 |
| 2015/0129360 A1 * | 5/2015 | Shiver | E06C 1/06 | 182/116 |
| 2015/0230612 A1 * | 8/2015 | Weber, Jr. | A47C 4/021 | 297/130 |

* cited by examiner

SPORT SEATING SYSTEM AND METHOD

CROSS-REFERENCE TO RELATED APPLICATION

This application claims priority in U.S. Provisional Patent Application Ser. No. 61/864,254, filed Aug. 9, 2013, which is incorporated herein by reference.

BACKGROUND OF THE INVENTION

1. Field of the Invention

The present invention relates generally to seating, and in particular to a system and method for providing adjustable, multi-purpose seating for sports and other activities.

2. Description of the Related Art

Hunters, especially bow hunters, require a place to sit and wait for game. Often this will be a transportable chair or a semi-permanent tree stand. Other sports and outdoor activities in the wilderness require similar seating.

Existing hunting stands and hunting chairs either require semi-permanent installation of a tree stand in a tree, which then cannot be moved, or rely on standard portable chairs which are carried out into the wilderness where they are not optimally suited. Most portable chairs are heavy and difficult to carry long distances, or are cheaply made and do not stand up to the rigors of the sport or activity for which they would need to facilitate. Ideal sporting chairs also include the ability to store equipment, such as a hunting bow, when the chair is not in use. Most could not stand on their own when loaded in such a way.

What is needed is a versatile, sturdy sporting chair which can be easily transported deep into the wilderness by a single person. Heretofore there has not been available a sporting chair system with the advantages and features of the present invention.

SUMMARY OF THE INVENTION

The present invention generally provides a sport or hunting chair which can be adapted to various sizes and configurations of seating. The chair system includes numerous detachable elements, such as legs and arms, which can be placed in different configurations for transport or working use. The chair system can stand on an included base or be strapped to a tree, and will provide suitable seating for any sport or outdoor activity. Additionally, this device can provide seating for relatively large individuals.

Attachments can accommodate both right-handed and left-handed occupants using archery equipment, firearms, fishing tackle and other devices and equipment. The seating system is both portable and adjustable for use in wilderness areas and for supporting occupants at various heights.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Said terminology will include the words specifically mentioned, derivatives thereof and words of similar meaning.

II. Preferred Embodiment Sporting Chair System 2

Figure 1:
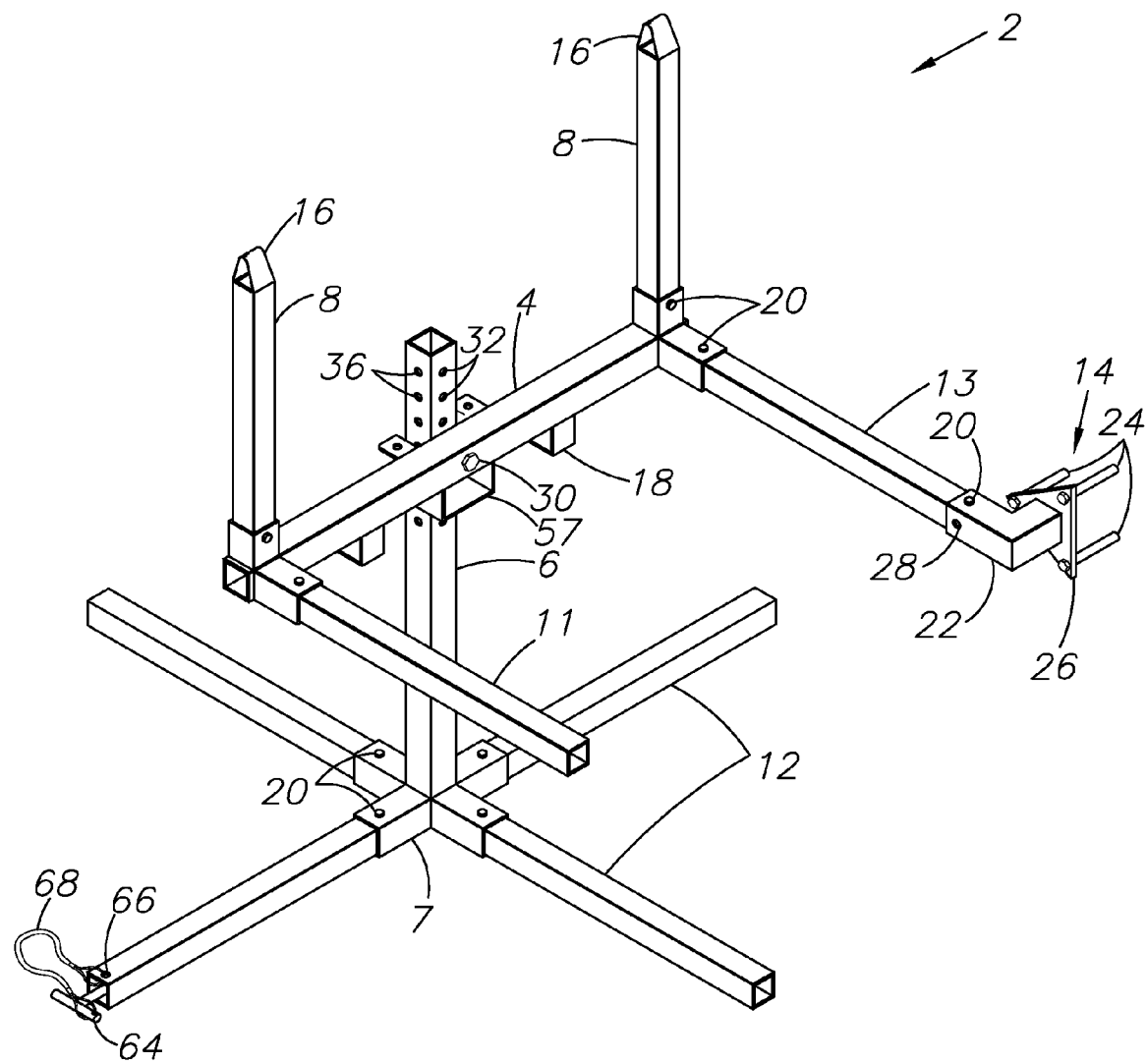
FIG. 1 is a front isometric view of a preferred embodiment of the present invention showing the frame in an assembled configuration.

The sporting chair system 2 frame as shown in FIG. 1 is formed from many interlocking, interchangeable elements. A center crossbar 4 is bolted to a base 6 via a bolt 30 and wing nut 40, and is further secured via a mounting pin 34. A pair of upstanding backrest arms 8 are inserted into the crossbar 4. Each backrest arm 8 includes a button clip 20 which is received in a button clip receiver located in the crossbar 4. This allows for the backrest arm 8 to be selectively removed. Each backrest arm 8 also includes a strap receiver loop 16 for receive a strap hook 59 connected to a shoulder strap 55 when the sporting chair system 2 is placed in a transport configuration. The center crossbar 4 also includes a gusset 57 to brace and prevent the center crossbar from bending, specifically when the sporting chair system 2 is mounted to a tree 58.

The center crossbar 4 may include drainage holes (not shown) in its bottom face, preferably located below the backrest arms, for draining water from the frame. This may be necessary since the backrest arms 8 are hollow and open at the top.

A pair of seat arms 11, 13 are similarly connected to the crossbar 4 and secured via button clips 20. One seat arm 13 includes a double button clip 20, having one clip located on the top and another on the bottom of the arm 13. This arm receives a holder 14 which is used to hold a bow or other item (not shown) when not in use. The holder 14 includes a number of holder pins 24 bolted to a holder base plate 26 connected to a holder elbow 22. The holder includes a button clip receiver hole 28 on each face of the elbow 22, which allows the holder 14 to be rotated as the user requires, and allows the system 2 to accommodate right-handed and left-handed hunters. The seat arms 11, 13 thus may be placed on either end of the center crossbar 4 as needed.

Figure 9:
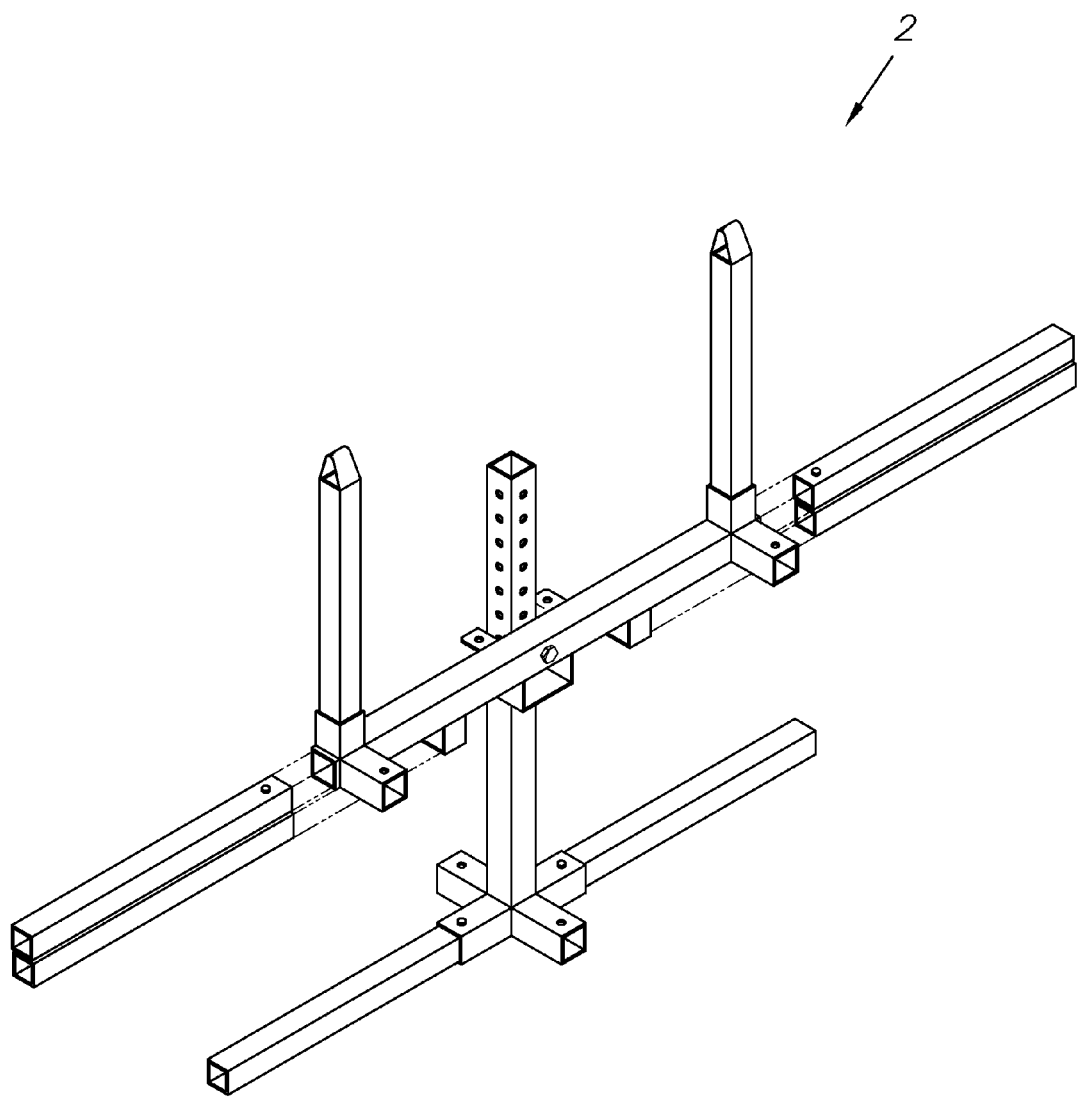
FIG. 9 is a front isometric view of a preferred embodiment of the present invention being assembled into a transport configuration.
Figure 10:
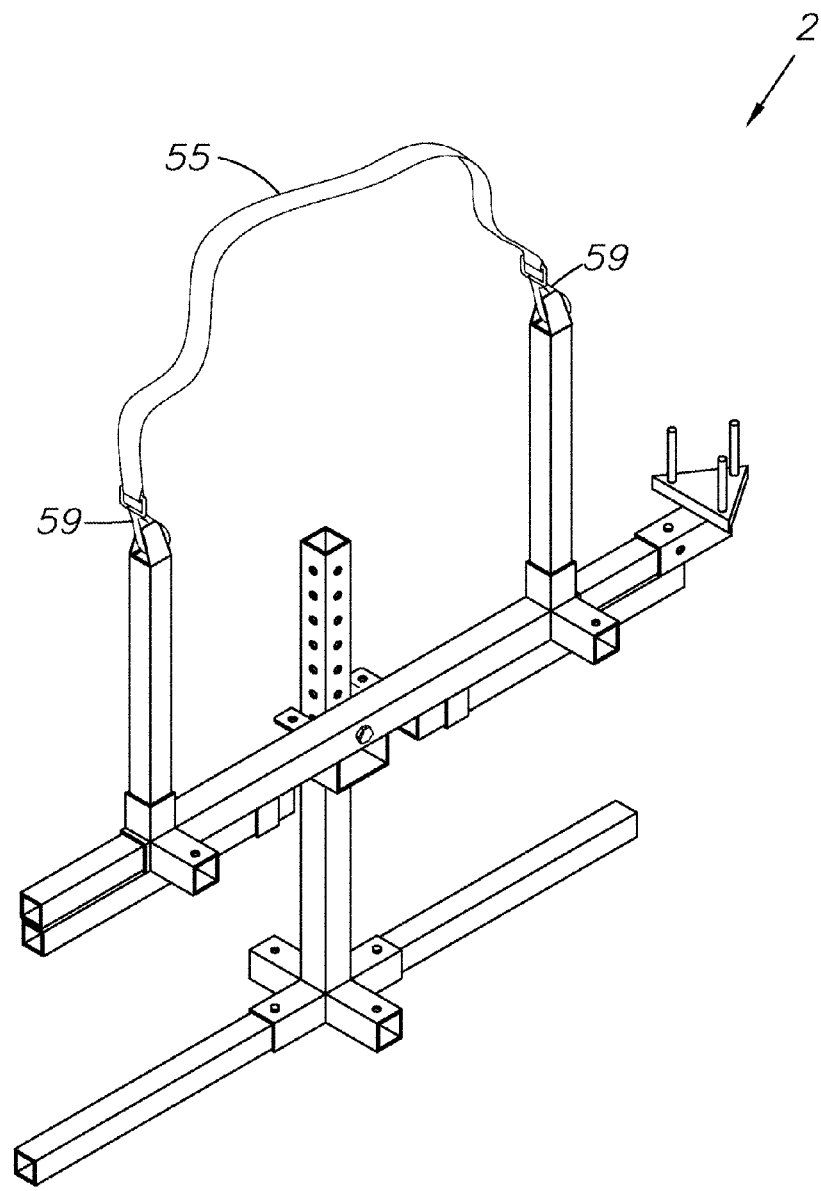
FIG. 10 is a continuation thereof, showing the assembled embodiment in a transport configuration.

The base includes a number of bolt receivers 32 and pin receivers 36 for receiving the mounting bolt 30 and mounting pin 34 respectively. The base also features a 4-way receiver 7 which allows four legs 12 to be secured to the base 6 using button clips 20, similar to the arms above. One leg includes a ground stake 64 secured to a ground stake hole 66 via a retaining cable 68. This spike is used to provide additional security to the leg located opposite the holder 14, such that when the holder 14 is holding an object, but no one is sitting in the chair, the chair will not tip over. The stake 64 may be temporarily stored within the hollow body of a leg 12. All legs could potentially have a separate ground stake 64. The legs 12 may be unclipped from the base 6 and inserted into receivers 18 when the chair is transformed into a transport configuration as shown in FIGS. 9-10 and discussed in more detail below.

Figure 2:
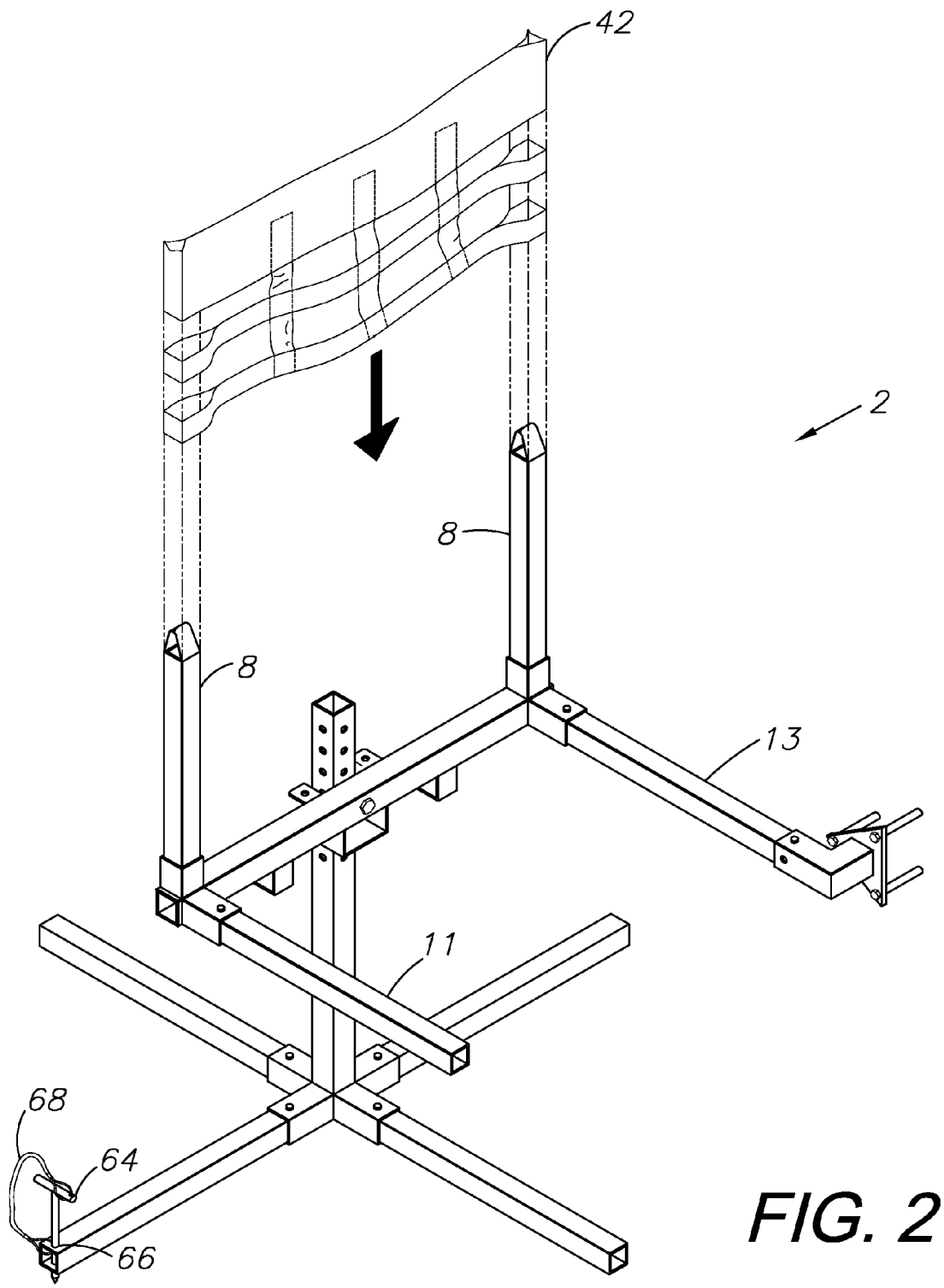
FIG. 2 is a front isometric view of a preferred embodiment of the present invention showing a seat back being placed on the frame.
Figure 3:
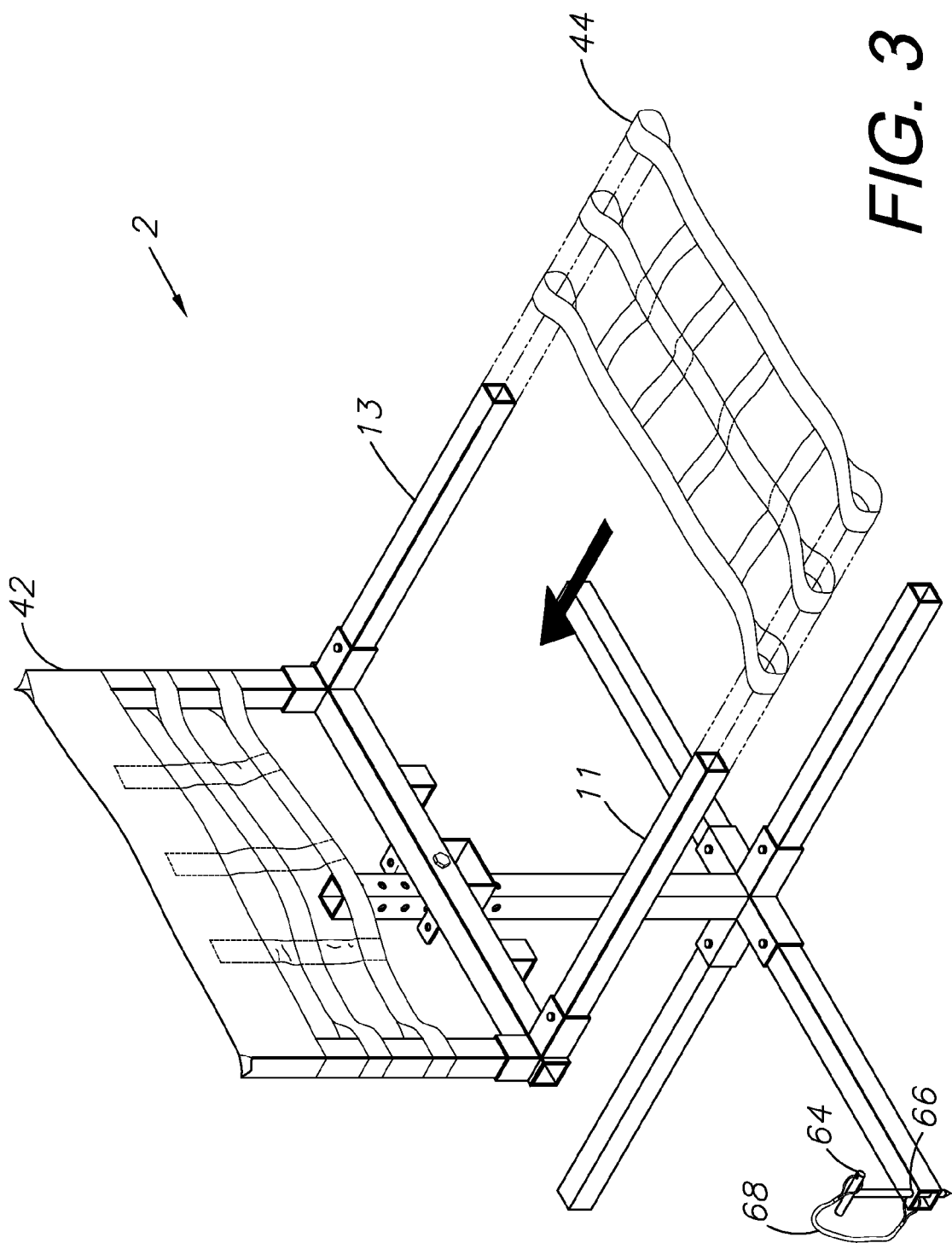
FIG. 3 is a front isometric view of a preferred embodiment of the present invention showing a seat being placed on the frame.
Figure 4:
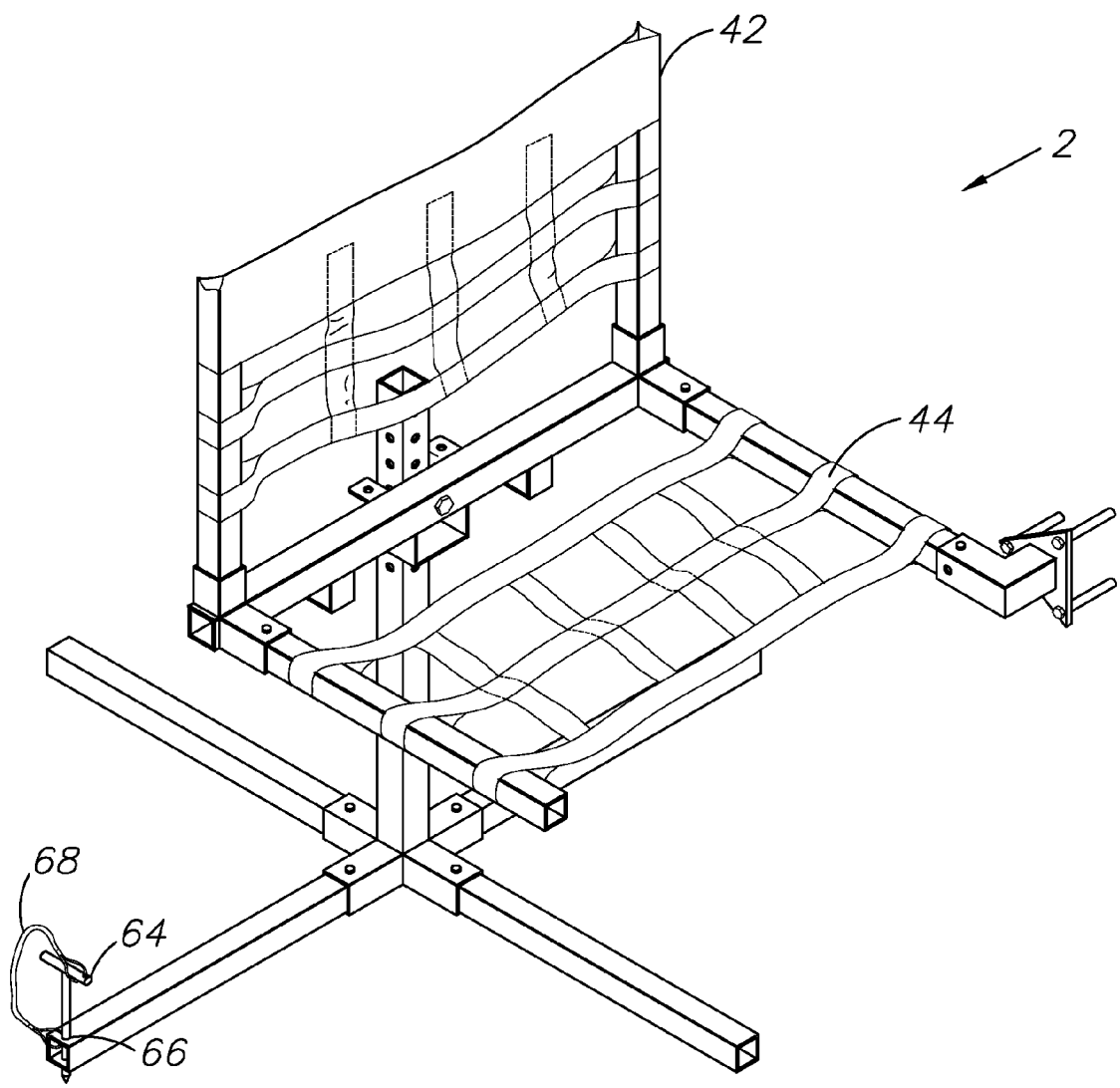
FIG. 4 is a front isometric view of a preferred embodiment of the present invention in an assembled, working configuration.

As shown in FIG. 2, a backrest 42 is placed over the backrest arms 8 when the chair system 2 is in a working configuration. As further shown in FIG. 3, a seat 44 is similarly placed over the seat arms 11, 13. The backrest 42 and seat 44 are made of a waterproof, durable material. They are easily removable from the frame so that the chair system frame may be left in the wilderness without worrying about additional weathering of the seat and backrest material. FIG. 4 shows an entirely assembled sporting chair system 2 in a working position, including both the backrest 42 and the seat 44. The ground stake 64 is employed to secure the chair to the ground.

Figure 5:
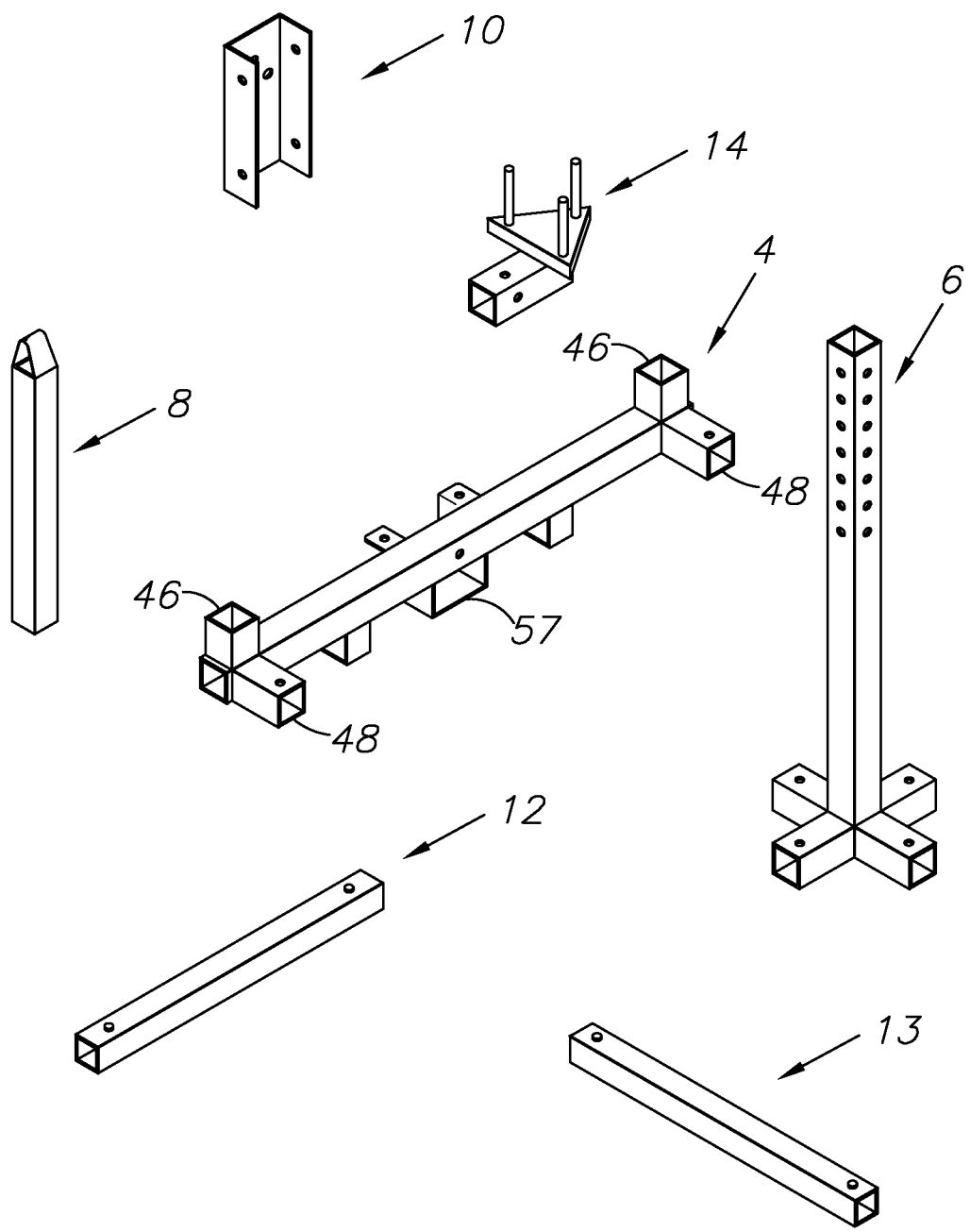
FIG. 5 is an isometric view of the various components which make up the frame of a preferred embodiment of the present invention.
Figure 11:
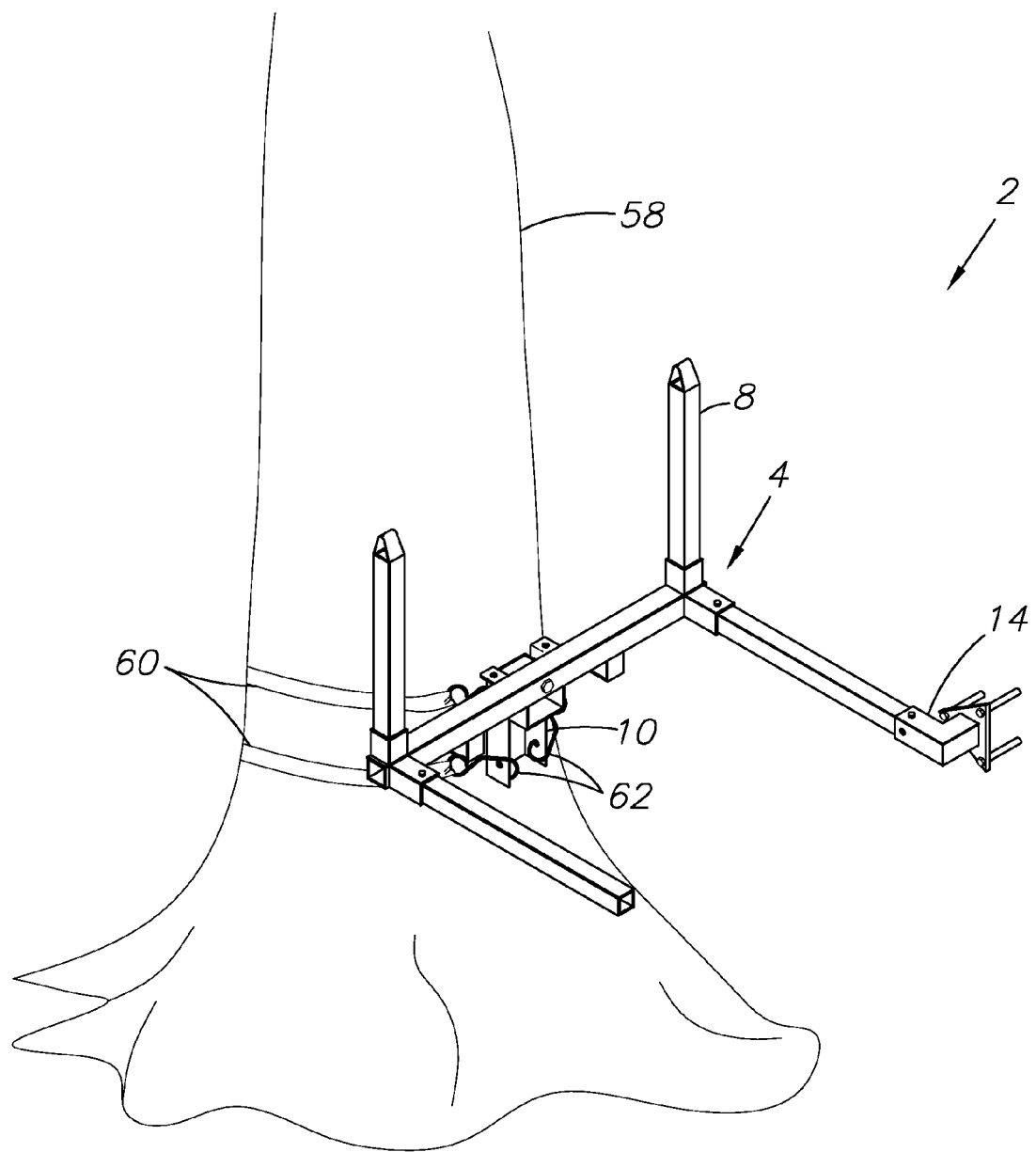
FIG. 11 is a front isometric view of an alternative arrangement of a preferred embodiment shown in a typical environment.

FIG. 5 shows all of the various elements which make up the frame of the sporting chair system 2, including a mounting bracket 10 for mounting the chair to a tree 58 or other object, as shown in more detail in FIG. 11. Also shown are the backrest arm receiver holes 46 and seat arm receiver holes 48 for connecting the backrest arms 8 and seat arms 11, 13 to the central crossbar 4.

Figure 6:
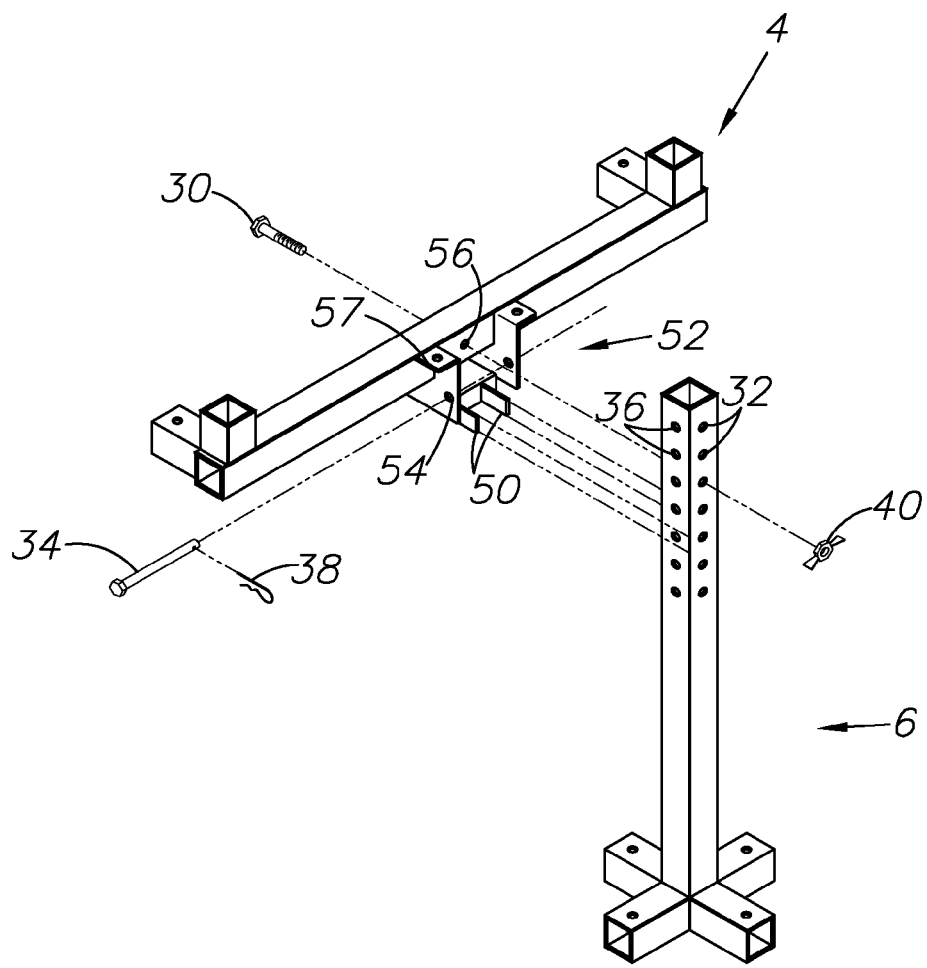
FIG. 6 is a rear exploded isometric view of two components of a preferred embodiment of the present invention.
Figure 7:
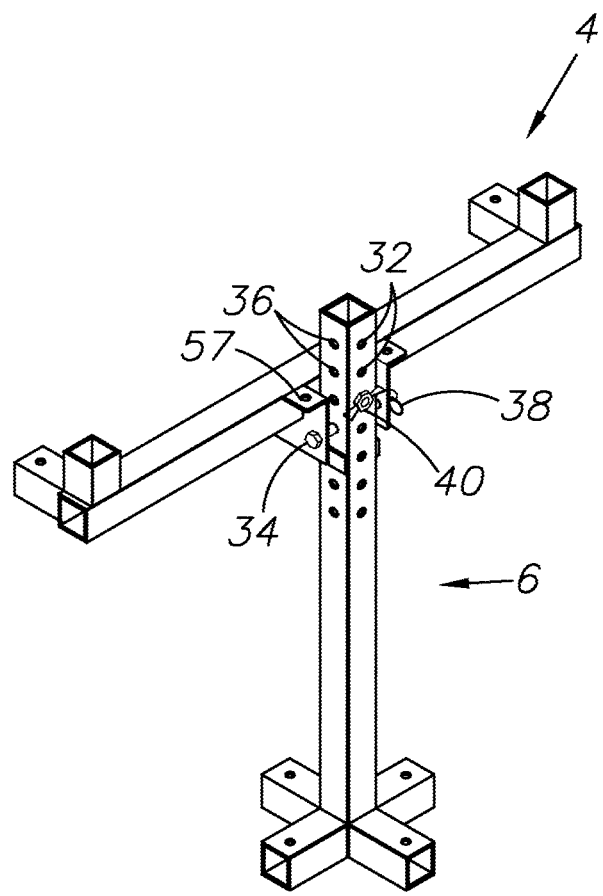
FIG. 7 is a rear isometric view thereof, showing the components assembled.

FIGS. 6-7 show how the crossbar 4 connects with the base 6 from another view, focusing on the mounting bracket 52 which includes the gusset 57. A pair of tower guide tabs 50 help to line up the base and keep the center crossbar 4 stable. The mounting pin 34 is threaded through a mounting pin receiver hole 54 in the gusset 57, through the pin receiver holes 36 in the base 6, and is pinned with a cotter pin 38 to prevent the mounting pin from being removed accidentally. The mounting bolt 30 is similarly threaded through a bolt hole 56 in the crossbar 4 and through bolt holes 32 in the base 6. The bolt 30 is secured via a wing nut 40 or other suitable nut.

Figure 8:
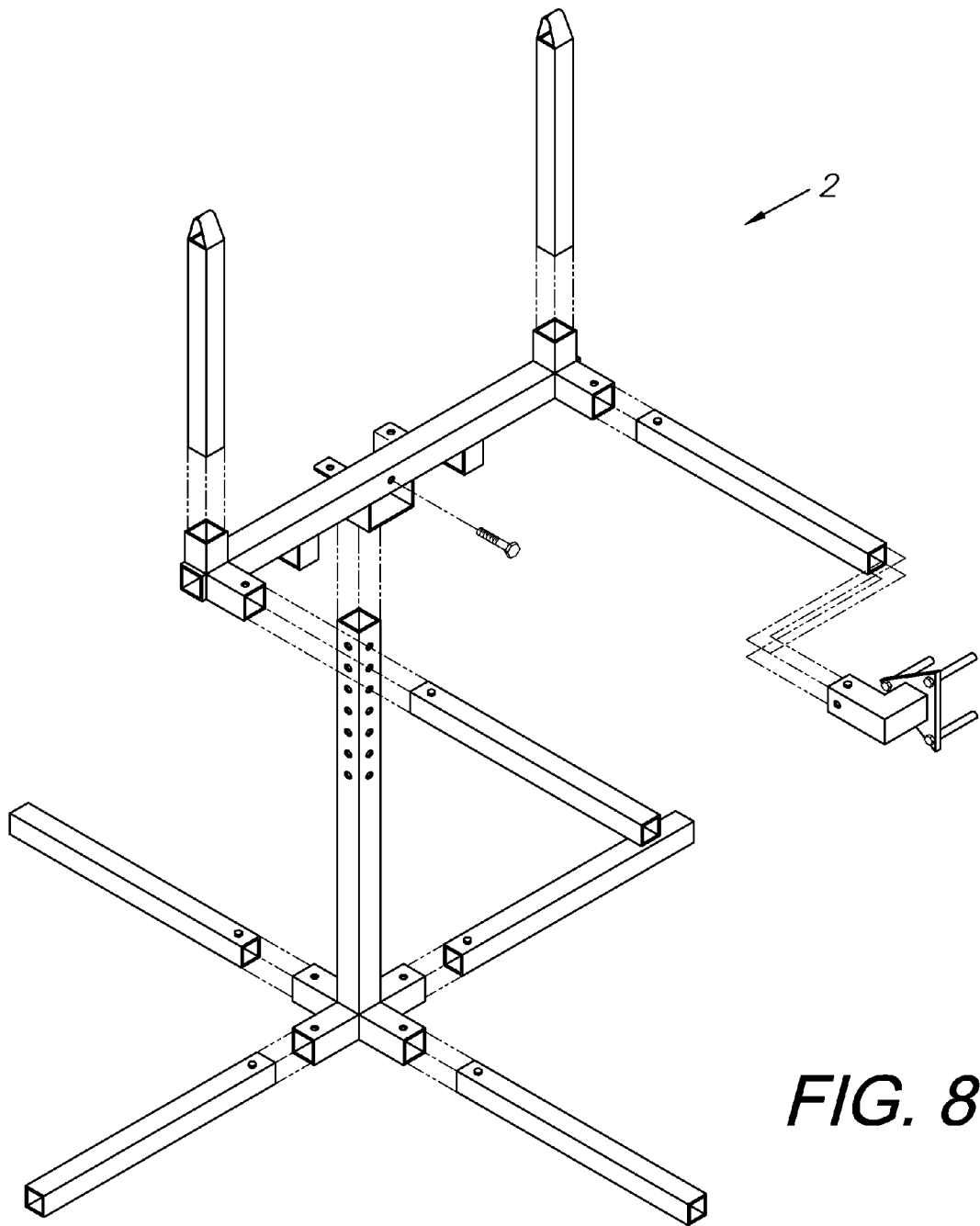
FIG. 8 is an exploded isometric view of the frame of a preferred embodiment of the present invention.

FIG. 8 shows the sporting chair system 2 as the components would be assembled to form a working configuration, or disassembled from a working configuration. FIG. 9 similarly shows how the components, including the legs 12 and seat arms 11, 13 would be reassembled into a transport configuration, shown completely assembled at FIG. 10. Note that the base 6 and the crossbar 4 are connected in a more compact configuration by changing which bolt hole receivers on the base are bolted to the crossbar via the mounting bolt 30. FIG. 10 further shows how a strap 55 is hooked to the backrest arms 8 via a pair of hooks 59, each hooked through a receiving loop 16 in the backrest arms 8. The strap allows a person to simply transport the sporting chair system 2 when in a transport configuration. The chair is designed such that the weight is distributed comfortably in such a configuration.

Figure 12:
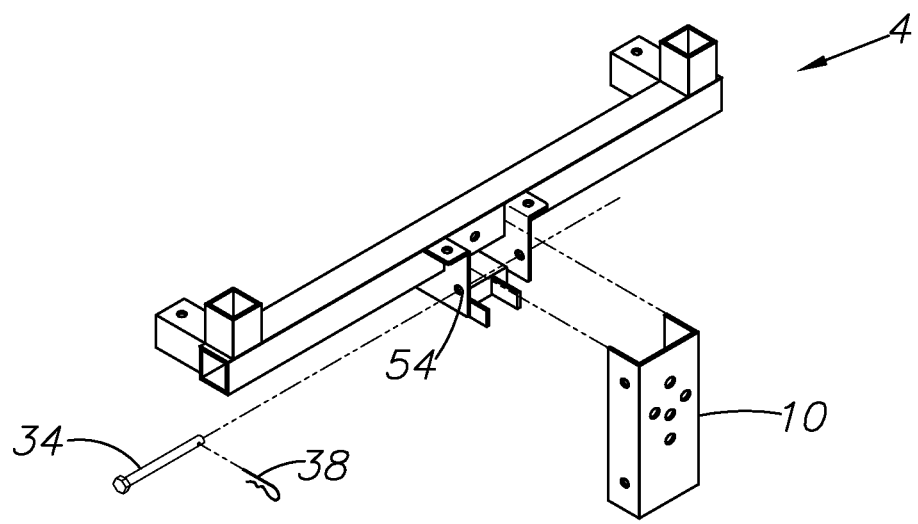
FIG. 12 is a rear exploded isometric of two components of an embodiment of the present invention.
Figure 13:
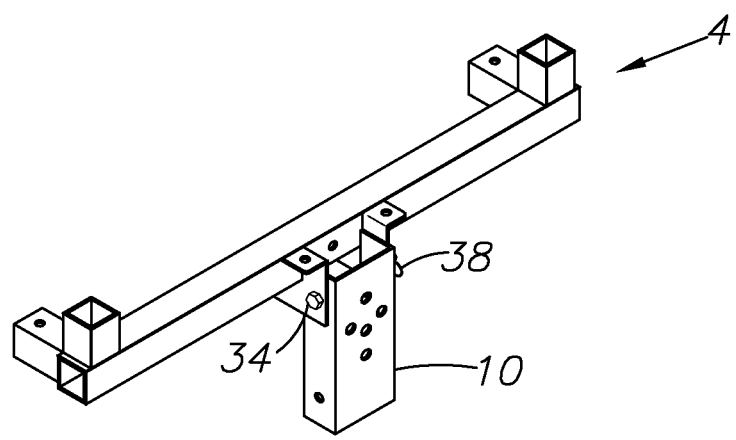
FIG. 13 is a rear isometric view thereof, showing the components assembled.

FIG. 11 shows how the sporting chair system 2 can be converted to be anchored to a tree 58. The mounting bracket 10 is affixed to the crossbar 4 in place of the base 6, as shown in FIGS. 12-13. The bracket is used to hook a pair of ratchet straps hooks 62 to the chair, and then to wrap the ratchet straps 60 around a tree 58. The straps can then be tightened and the chair becomes anchored to the tree. The connection between the bracket 10 and the crossbar 4 is such that when the ratchet straps 60 are tightened, it pulls the seat upwards, counteracting the weight of the user sitting in the chair.

The bracket 10 is mounted to the crossbar 4 via the same mounting pin 34 used to mount the base 6 to the crossbar. This is shown in FIGS. 12-13. Note that the bracket 10 does contain several bolt holes which could be used to further bolt the bracket to the crossbar or to store the bracket on the base 6 when the bracket is not in use. These holes can also be used to hold the ratchet strap hooks 62 temporarily while setting the ratchet straps up. For example, the first ratchet strap will not sufficiently grip the inner edge of the bracket as shown in FIG. 11 until the second strap is sufficiently tightened. The holes through the bracket 10 allow the hooks 62 to be temporarily placed through those holes to hold the seat in place as the second strap is installed. The hooks can then be moved as shown in FIG. 11. The preferred manner of gripping the bracket 10 with the hooks 62 is as shown in FIG. 11, as this provides the proper torque to the seat to counteract the user's weight, while ensuring that the bracket 10 is held firmly against the tree 58.

As stated above and documented through the figures, the primary purpose of the sporting chair system 2 is to provide a reliable, sturdy sporting chair which can be transformed from a working configuration to a transport configuration quickly and easily, and which is easily transportable once converted. The chair system 2 must be versatile, strong, and balanced. The present invention can hold the heaviest bow on the market within the holder 14 with no user seated in the chair without tipping over, and that is without using the ground stake 64.

It is to be understood that the invention can be embodied in various forms, and is not to be limited to the examples discussed above. The range of components and configurations which can be utilized in the practice of the present invention is virtually unlimited.

Having thus described the invention, what is claimed as new and desired to be secured by Letters Patent is:

1. A sporting chair system for constructing a sporting chair, the system comprising:
   a sporting chair including a frame, said frame comprising a central crossbar, two seat-back arms, a first seat arm and a second seat arm, and a base;
   said central crossbar including a front face, a rear face, a top face, and a bottom face;
   each of said two seat-back arms having a button clip, and each configured to releasably connect into two respective seat-back arm receivers affixed to the top face of said central crossbar;
   said first seat arm having a single button clip and being configured to releasably connect into one of two seat arm receivers affixed to the front face of said central crossbar, said second seat arm having a proximal end including the single button clip and a distal end including a double button clip, and wherein said second seat arm proximal end being configured to releasably connect into one of said seat arm receivers;

said base releasably connected to the rear face of said central crossbar, said base including four detachable legs, each leg having a button clip and configured to releasably connect into a respective leg receiver affixed to said base; and wherein the sporting chair is transformable between a first, working position and a second, transport position.

2. The sporting chair system of claim 1, further comprising:
wherein said first, working position comprises:
all four detachable legs engaging a respective leg receiver of said base;
both said first seat arm and said second seat arm engaging a respective seat arm receiver;
a seat-back placed over said seat-back arms; and
a seat placed over said seat arms.

3. The sporting chair system of claim 2, further comprising:
said base including a plurality of base bolt holes corresponding with a crossbar bolt hole located in said central crossbar;
a mounting bolt threaded through one of said base bolt holes and said crossbar bolt hole; and
a wing-nut securing said bolt.

4. The sporting chair system of claim 2, further comprising:
said base including a plurality of base pin holes corresponding with a pair of gusset pin holes located on a gusset brace welded to said central crossbar;
a mounting pin threaded through one of said base pin holes in said base and gusset pin holes; and
a cotter pin securing said pin.

5. The sporting chair system of claim 2, further comprising:
at least one of said detachable legs including a ground spike tethered to a receiver hole located at the end of the leg furthest from said base;
said ground spike capable of pinning said leg to the earth; and
said ground spike further capable of being stored within the end of said leg.

6. The sporting chair system of claim 1, further comprising at least one drain hole located in said central crossbar bottom face.

7. The sporting chair system of claim 1, further comprising:
a holder releasably clipped to the distal end of said second seat arm;
said holder comprising a holder base plate and three holder pins bolted to said holder base plate; and
said holder configured to hold sporting equipment.

8. The sporting chair system of claim 7, wherein said sporting equipment is a hunting bow.

9. The sporting chair system of claim 1, further comprising:
wherein said second, transport position comprises:
two of said four detachable legs engaging a respective leg receiver of said base;
two of said four detachable legs inserted into respective leg transport receivers affixed to the bottom face of said crossbar;
said first seat arm inserted into a first end of said crossbar;
said second seat arm inserted into a second end of said crossbar;
each said seat-back arm including a hook receiver; and
a strap including a pair of hooks, each hook clipped to respective hook-receiver of a respective seat-back arm.

10. The sporting chair system of claim 9, further comprising:
said base including a plurality of bolt holes corresponding with a bolt hole located in said central crossbar;
a mounting bolt threaded through the bottom-most bolt hole of said bolt holes located in said base and said bolt hole ins aid central crossbar; and
a wing-nut securing said bolt within said bolt holes.

11. The sporting chair system of claim 10, further comprising:
said base including a plurality of base pin holes corresponding with a pair of gusset pin holes located on a gusset brace welded to said central crossbar;
a mounting pin threaded through the bottom-most of said base pin holes in said base and gusset pin holes; and
a cotter pin securing said pin.

12. A sporting chair system for constructing a sporting chair and mounting the chair to a tree, the system comprising:
a sporting chair including a frame, said frame comprising a central crossbar, two seat-back arms, a first seat arm and a second seat arm, and a mounting channel;
said central crossbar including a front face, a rear face, a top face, and a bottom face;
each of said two seat-back arms having a button clip, and each configured to releasably connect into two respective seat-back arm receivers affixed to the top face of said central crossbar;
said first seat arm having a single button clip and being configured to releasably connect into one of two seat arm receivers affixed to the front face of said central crossbar, said second seat arm having a proximal end including the single button clip and a distal end including a double button clip, and wherein said second seat arm proximal end being configured to releasably connect into one of said seat arm receivers;
said mounting channel releasably connected to the rear face of said central crossbar, said mounting channel including two side plates affixed perpendicular to a rectangular back plate;
wherein the sporting chair is transformable between a first, working position and a second, transport position;
wherein said first, working position comprises:
said mounting channel including a pair of channel pin holes corresponding with a pair of gusset pin holes located on a gusset brace welded to said central crossbar;
a mounting pin threaded through the pair of channel pin holes and the pair of gusset pin holes;
a cotter pin securing said pin;
a seat-back placed over said seat-back arms; and
a seat placed over said seat arms.

13. The system of claim 12, further comprising:
a pair of ratchet straps wrapping around a tree trunk, each said ratchet strap including a pair of hooks;
said hooks configured to be hooked to the side plates of said mounting channel; and
said ratchet straps configured to be tightened, thereby securing said sporting chair to said tree trunk.

14. The sporting chair system of claim 12, further comprising:
a holder releasably clipped to the distal end of said second seat arm;
said holder comprising a holder base plate and three holder pins bolted to said holder base plate; and
said holder configured to hold sporting equipment.

15. The sporting chair system of claim 14, wherein said sporting equipment is a hunting bow.

* * * * *